2 Sheets—Sheet 1.

F. A. KELLEY.
Apparatus for Loading and Unloading Hay, &c.

No. 212,097. Patented Feb. 11, 1879.

Witnesses
N. W. Chace.
D. B. Lawler

Inventor
Frank A. Kelley
per J. L. Boone
Attorney

2 Sheets—Sheet 2.

F. A. KELLEY.
Apparatus for Loading and Unloading Hay, &c.

No. 212,097. Patented Feb. 11, 1879.

Witnesses
H. M. Chace.
D. B. Lawler

Inventor
Frank A. Kelley
per J. L. Boone
Attorney

UNITED STATES PATENT OFFICE.

FRANK A. KELLEY, OF PETALUMA, CALIFORNIA.

IMPROVEMENT IN APPARATUS FOR LOADING AND UNLOADING HAY, &c.

Specification forming part of Letters Patent No. 212,097, dated February 11, 1879; application filed November 4, 1878.

*To all whom it may concern:*

Be it known that I, FRANK A. KELLEY, of Petaluma, county of Sonoma, State of California, have invented an Apparatus for Unloading and Stacking Hay and Grain; and I do hereby declare that the following is a full, clear, and exact description thereof, reference being had to certain drawings accompanying this specification, and forming a part of the same.

The object of my invention is to provide an arrangement of ropes and nets whereby a wagon-load of hay or grain can be transferred bodily from the wagon to a stack without the aid of a derrick.

By my arrangement the stack itself is made to supply the place of a derrick, the load being rolled up the side of the stack and deposited at any desired point, all as hereinafter described.

Figure 1:
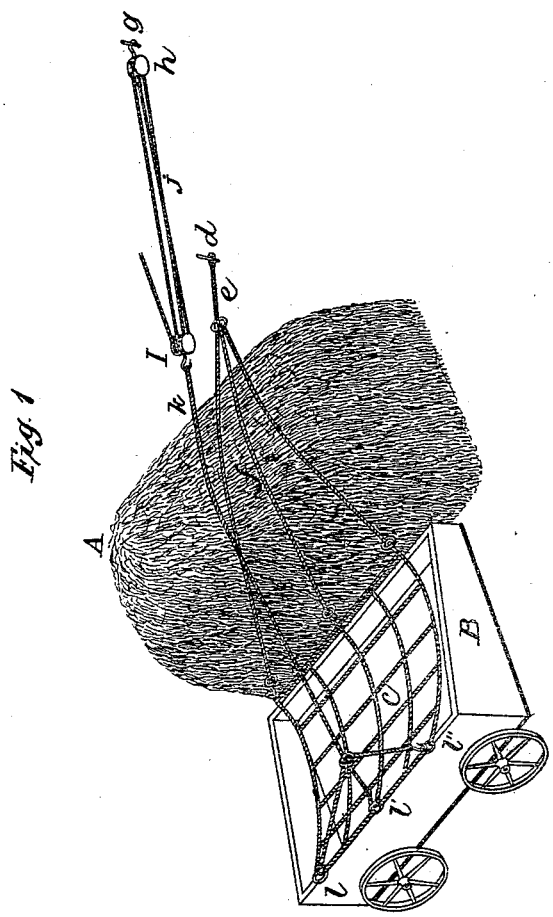
Figure 2:
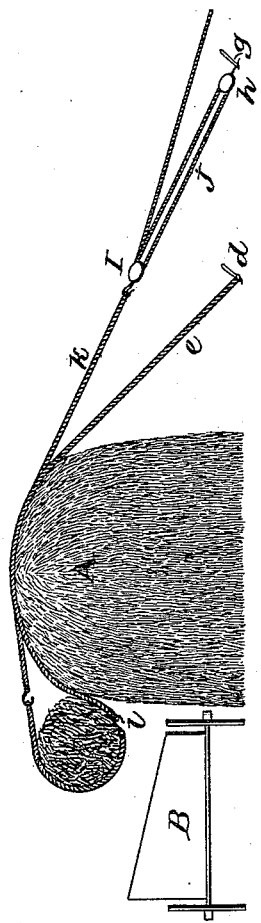

Referring to the accompanying drawings, Figure 1, Sheet 1, is a perspective view. Fig. 2, Sheet 2, is a side view, showing the load on the way up the stack.

Let A represent the stack, which I have represented for the purpose of this description as being of considerable height. B is a header-wagon, such as is used for hauling grain from the header to the stack.

To enable me to handle the load at a single lift, I employ a wagon-net, C, such as is used for lifting the load with a derrick. This net is spread upon the bottom of the wagon before the hay or grain is loaded into it, so that the entire load can be removed at once, as hereinafter specified.

On the side of the stack opposite the wagon I drive a stake, $d$, to which I attach one end of a rope, $e$. The opposite end of this rope I attach to one end of what I call the "stack-net," marked $f$. This stack-net lies upon and extends over the top of the stack and down to the side of the wagon, as shown, and its edge is provided with means for attaching it to the inner edge of the wagon-net.

At a distance from the stack on the same side that the stake $d$ is driven I drive another stake, $g$, to which I attach a block, $h$. This block is connected with a double sheave block or fall, I, by a rope, $j$.

The fall I has a rope, $k$, attached to it, which also passes up over the stack, and its opposite end has three branches, $l\ l^1\ l^2$, which are arranged to pass over the load in the wagon and be attached to the outer side of the wagon-net.

A horse is hitched to the end of the rope $j$ at the fall, so when it is driven away from the stack the block or fall I is drawn toward the block $h$, and the upper rope, $k$, is drawn over the stack.

Now, the wagon being in position to be unloaded, and the stack-net $f$ being spread out over the stack, the edge of the stack-net is attached to the inner edge of the wagon-net. The rope $k$ is then drawn out over the load in the wagon, and its branches $l\ l^1\ l^2$ attached to the outer edge of the wagon-net. The horse is then driven away from the stack, so as to haul upon the upper rope, $k$. This causes the load to roll over upon the stack-net, and as long as the horse travels in that direction the load is rolled over and over by the pull on the upper rope, $k$, and wagon-net, so as to roll the load up the sides of the stack to its top or to any other part of the stack desired. The wagon-net is then detached and placed in the wagon again ready to receive another load, while the hands at the stack draw the stack-net out from under the load and spread it again for another lift.

For attaching the stack-net to the wagon-net, I shall usually use hooks and eyes, and will place the eyes upon the edge of the stack-net, so that it will draw out of the straw or grain easily; but any other convenient attaching device can be used.

The shape of the nettings is immaterial, but they should be long enough to prevent the load from becoming separated until it reaches the stack. The horse might be hitched directly to the end of the rope $k$, but I prefer to use the block and fall.

By this arrangement I can use a single spread-net in the wagon instead of the two-part nets heretofore employed when the load was hoisted by a derrick.

The device is extremely simple, and enables one to unload and stack hay or grain in a shorter space of time and with the expenditure of less power than by the derrick system, as the load can be rolled up the side of the stack much easier than it can be hoisted bodily into the air and swung over the place where it is to be dumped.

I also avoid the necessity of having to move a heavy clumsy derrick around the field, and the whole operation is simple and cheaper than the derrick system.

Having thus described my invention, what I claim, and desire to secure by Letters Patent, is—

1. The method of handling hay and grain to transfer it from a wagon to a stack, consisting in rolling it from the wagon and up the side of the stack by means of a rope or netting, or a combination of ropes and netting passing over the stack and around the load, so that by drawing upon the upper side of the rope or netting the load is rolled over and over, substantially as above specified.

2. The wagon-net C, provided with attaching devices on both edges, in combination with the stack-net $f$, with its attaching edge, and the upper or hauling rope, $k$, with its branches $l\ l^1\ l^2$, each of which is provided with means for attaching it to the outer edge of the wagon-net, substantially as and for the purpose described.

3. The rope $e$, having one end secured to a stake, $d$, while its opposite end is connected with a stack-net, $f$, and the rope $j$, with its block $h$, and fall $I$, attached to a stake, $d$, and having the rope $k$, provided with the branches $l\ l^1\ l^2$, in combination with the wagon-net C, substantially as and for the purpose described.

In witness whereof I have hereunto set my hand and seal.

FRANK A. KELLEY. [L. S.]

Witnesses:
   J. A. WAGMIRE,
   H. M. CHACE.